United States Patent [19]

Umemoto et al.

[11] Patent Number: 5,013,916
[45] Date of Patent: May 7, 1991

[54] METHOD AND APPARATUS FOR RECORDING AND READING OUT RADIATION IMAGES

[75] Inventors: Chiyuki Umemoto; Takashi Nakamura; Kenji Takahashi; Yuichi Hosoi, all of Kanagawa, Japan

[73] Assignee: Fuji Photo Film Co., Ltd., Kanagawa, Japan

[21] Appl. No.: 499,755

[22] Filed: Mar. 27, 1990

[30] Foreign Application Priority Data

Mar. 27, 1989 [JP] Japan .................................. 1-74710
Jun. 23, 1989 [JP] Japan .................................. 1-161028

[51] Int. Cl.$^5$ ...................... G01N 23/04; C09K 11/86
[52] U.S. Cl. .............................. 250/327.2; 250/484.1; 252/301.4 H
[58] Field of Search .................... 250/327.2, 484.1 A, 250/484.1 B; 252/301.4 H

[56] References Cited

U.S. PATENT DOCUMENTS

| | | |
|---|---|---|
| 4,230,598 | 10/1980 | Vedrine et al. .............. 252/301.4 H |
| 4,236,078 | 11/1980 | Kotera et al. . |
| 4,258,264 | 3/1981 | Kotera et al. . |
| 4,276,473 | 6/1981 | Kato et al. . |
| 4,315,318 | 2/1982 | Kato et al. . |
| 4,387,428 | 6/1983 | Ishida et al. . |
| 4,400,619 | 8/1983 | Kotera et al. . |
| 4,515,706 | 5/1985 | Yakahara et al. ............ 252/301.4 H |
| 4,527,060 | 7/1985 | Suzuki et al. . |
| 4,543,479 | 9/1985 | Kato . |
| 4,793,944 | 12/1988 | Herzog et al. ................ 252/301.4 H |
| 4,851,679 | 7/1989 | Tamura et al. . |
| 4,864,134 | 9/1989 | Hosoi et al. . |

FOREIGN PATENT DOCUMENTS 56-11395 2/1981 Japan .
56-12599 2/1981 Japan .

Primary Examiner—Edward P. Westin
Assistant Examiner—Richard Hanig
Attorney, Agent, or Firm—Sughrue, Mion, Zinn Macpeak & Seas

[57] ABSTRACT

A recording material is exposed to radiation carrying image information in order to store a radiation image thereon. The recording material is provided with a stimulable phosphor layer constituted of a cerium activated lanthanum oxyhalide phoshor which is represented by the general formula LaOX:xCe, where X is at least one halogen selected from the group consisting of Cl, Br, and I, and x is a number satisfying the condition $0 < x \leq 0.2$, and in which the atomic ratio X/La satisfies the condition $0.50 < X/La \leq 0.998$. After a radiation image has been recorded on it, the recording material is exposed to stimulating rays, which cause it to emit light in proportion to the amount of energy stored thereon during its exposure to radiation, and the emitted light is photoelectrically detected in order to obtain an image signal. The recording material is then subjected to primary and secondary erasing operations in order to release any energy still stored thereon.

17 Claims, 3 Drawing Sheets

METHOD AND APPARATUS FOR RECORDING AND READING OUT RADIATION IMAGES

BACKGROUND OF THE INVENTION

1. Field of the Invention

This invention relates to a radiation image recording and read-out method wherein a recording material provided with a stimulable phosphor layer is exposed to radiation, which causes a radiation image to be stored thereon, and is thereafter exposed to stimulating rays, which cause the recording material to emit light in proportion to the amount of energy stored thereon during its exposure to the radiation, with the emitted light then being detected and converted into an electric signal. This invention particularly relates to a radiation image recording and read-out method wherein a recording material capable of being stimulated by stimulating rays having comparatively long wavelengths is used. This invention also relates to an apparatus for carrying out the radiation image recording and read-out method.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to radiation is exposed to stimulating rays such as visible light, the phosphor emits light in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a recording material provided with a layer of the stimulable phosphor is first exposed to radiation which has passed through an object, such as the human body, which causes a radiation image of the object to be stored thereon, and is then exposed to stimulating rays, which cause the recording material to emit light in proportion to the amount of energy stored thereon during its exposure to radiation. The light emitted by the recording material upon stimulation thereof, is photoelectrically detected and converted into an electric image signal. The electric image signal is processed and used in order to reproduce a visible image which has good image quality and can serve as an effective tool in, particularly, the efficient and accurate diagnosis of an illness.

The recording material provided with the stimulable phosphor layer takes on the form of, for example, sheets, panels, drums, or endless belts. (Such a recording material will hereinafter be referred to as a stimulable phosphor sheet.)

In the radiation image recording and reproducing systems described above, the finally obtained visible image may be reproduced in the form of a hard copy or may be displayed on a cathode ray tube (CRT). Also, the stimulable phosphor sheet is used to store the radiation image temporarily, and the final visible image is reproduced on a final recording medium. For reasons of economy, therefore, it is desirable for the stimulable phosphor sheet to be reusable.

Further, a mobile X-ray diagnostic station, e.g. a bus serving as such, may be provided with a radiation image recording and read-out apparatus using stimulable phosphor sheets. In cases where such a mobile X-ray diagnostic station moves from place to place so that mass medical examinations may be recorded, it is disadvantageous to have to load the mobile X-ray diagnostic station with a large number of stimulable phosphor sheets, and therefore the number of stimulable phosphor sheets which can be carried along with the mobile X-ray diagnostic station is limited. Therefore, it is desirable that a small number of reusable stimulable phosphor sheets be carried along with the mobile X-ray diagnostic station, and that the stimulable phosphor sheets be circulated and reused for the recording and read-out of radiation images. With such a mobile X-ray diagnostic station, radiation image signals representing the images of many objects can be obtained. Also, if the stimulable phosphor sheets are circulated and reused, the recording of radiation images can be conducted continuously, and it becomes possible to increase the speed with which radiation images are recorded in mass medical examinations. This is very advantageous from the point of view of practical use.

In order for stimulable phosphor sheets to be reusable in the manner described above, energy remaining on the stimulable phosphor sheets after they have been exposed to stimulating rays during the readout of radiation images therefrom should be erased with the method disclosed in, for example, U.S. Pat. No. 4,400,619 or Japanese Unexamined Patent Publication No. 56(1981)-12599. The erased stimulable phosphor sheet can then be reused to record a radiation image.

In order to accomplish the aforesaid purpose, it is desirable that there be combined into a single apparatus: at least a single recording material which is provided with a stimulable phosphor layer and which can be circulated and reused, an image recording section for exposing the recording material to radiation which has passed through an object, an image read-out section for reading out the radiation image stored on the recording material, and an erasing section for erasing energy remaining on the recording material after the radiation image has been read out. A mobile X-ray diagnostic station allows medical examinations to be carried out at different locations, and the aforesaid apparatus is easy to load into such a mobile diagnostic station. Such an apparatus can easily be located in a hospital, or the like. This is very advantageous for practical use.

Accordingly, the applicant proposed in, for example, U.S. Pat. No. 4,543,479, a builtin type of radiation image recording and read-out apparatus which comprises an image recording section, an image read-out section, and an erasing section. At least a single recording material is secured to a support material, and the support material is circulated and moved with respect to the image recording section, the image read-out section, and the erasing section. The applicant also proposed in, for example, U.S. Pat. No. 4,851,679, a built-in type of radiation image recording and read-out apparatus comprising an image recording section, an image read-out section, and an erasing section which are located along a predetermined circulation path. A plurality of stimulable phosphor sheets which can be moved independently of one another are employed as recording materials. The stimulable phosphor sheets are sequentially moved along the circulation path and circulated through the image recording section, the image read-out section, and the erasing section. With the built-in type of radiation image recording and read-out apparatuses, a recording material (i.e. a stimulable phosphor sheet) can be reliably circulated and reused in the recording of a radiation image.

Nowadays there is a need for a built-in type of radiation image recording and read-out apparatus which is small in size and inexpensive. In order to satisfy this need, an attempt has been made to employ a semiconductor laser as the source for the stimulating rays in the image read-out section of a built-in type of radiation image recording and read-out apparatus. This is because semiconductor lasers are comparatively small in size and inexpensive. Among the various types of semiconductor lasers, the semiconductor laser which has the largest output power produces a laser beam having wavelengths falling within the range of 680 nm to 830 nm, the wavelengths of which range are longer than the wavelength (633 nm) produced by an He-Ne laser, or the like. He-Ne lasers have heretofore been used widely as the source of stimulating rays for stimulating the stimulable phosphors used in conventional recording materials. Therefore, the semiconductor laser which has the largest output power is not suitable for stimulating the stimulable phosphors used in conventional recording materials because of the long wavelengths it produces.

SUMMARY OF THE INVENTION

The primary object of the present invention is to provide a radiation image recording and read-out method which enables stimulating rays having comparatively long wavelengths to be used during the readout of a radiation image.

Another object of the present invention is to provide a radiation image recording and read-out method which enables the recording and readout of a radiation image to be carried out with a small and inexpensive apparatus.

The specific object of the present invention is to provide an apparatus for carrying out the radiation image recording and read-out method.

The inventors eagerly conducted studies, which revealed that a recording material provided with a layer of a specific stimulable phosphor can be stimulated with stimulating rays having comparatively long wavelengths, for example, a laser beam which is produced by a semiconductor laser and has wavelengths falling within the range of 680 nm to 830 nm. Such a recording material is provided with a stimulable phosphor layer constituted of a cerium activated lanthanum oxyhalide phosphor which is represented by the general formula LaOX:xCe where X is at least one halogen selected from the group consisting of Cl, Br, and I, and x is a number satisfying the condition $0 < x \leq 0.2$, and in which the atomic ratio X/La satisfies the condition $0.50 < X/La \leq 0.998$ The technique for using a cerium activated lanthanum oxyhalide phosphor for a radiation image storage panel (a stimulable phosphor sheet) has been disclosed in, for example, U.S. Pat. No. 4,236,078. However, this publication does not indicate anything about the ratio of X (a halogen) to La, nor does it describe anything about the relationship between the ratio of X to La and the light emission characteristics. The publication shows the stimulation spectrum of a stimulable phosphor represented by the formula LaOBr:Ce,Tb, i.e. the spectrum of stimulating rays which are capable of causing the stimulable phosphor to emit light in proportion to the amount of energy stored thereon during its exposure to radiation. The stimulation spectrum indicates that the stimulable phosphor represented by the formula LaOBr:Ce,Tb is stimulated to the largest extent by stimulating rays having wavelengths of approximately 530 nm. Specifically, such a known cerium activated lanthanum oxyhalide phosphor does not substantially absorb light produced by the He-Ne laser (which has a wavelength of 633 nm), which is currently used most widely, nor does it substantially absorb the light produced by semiconductor lasers (which have wavelengths of 680 nm, 750 nm, 780 nm, 830 nm, etc.), which are small in size and inexpensive.

The inventors studied the relationship between the ratio of X (a halogen) to La in the crystalline matrix of a cerium activated lanthanum oxyhalide phosphor and the light emission characteristics. It was found that a cerium activated lanthanum oxyhalide phosphor in which the atomic ratio X/La falls within a specific range below 1 exhibits a stimulation spectrum having rather long wavelengths and emits light with a high luminance when it is being stimulated. Specifically, when a cerium activated lanthanum oxyhalide phosphor in which the atomic ratio X/La satisfies the condition $0.50 < X/La \leq 0.998$ is used, it becomes possible to employ a semiconductor laser as the source for the stimulating rays.

However, La in the stimulable phosphor represented by the formula LaOX:xCe contains a radioactive isotope ($La^{138}$). Therefore, even if energy remaining on the recording material is erased after the radiation image has been read out, if the layer of the stimulable phosphor is represented by the formula LaOX:xCe, the recording material will immediately store energy from the radioactive isotope. When the recording material is reused for the recording and readout of a radiation image, noise will occur in any image signal detected from the recording material due to the energy stored from the radioactive isotope. As a result, black dots will appear in the visible image reproduced from the image signal.

The inventors carried out further experiments in order to eliminate the problem with regard to the noise and invented a radiation image recording and read-out method which utilizes a recording material provided with a layer of the stimulable phosphor represented by the formula LaOX:xCe, enables a laser beam produced by a semiconductor laser to be used in order to stimulate the recording material during the readout of a radiation image from the recording material, and prevents noise from occurring in an image signal detected from the recording material, which noise is due to energy being stored on the recording material after it has been erased. The inventors also invented an apparatus for carrying out the radiation image recording and read-out method.

Specifically, the present invention provides a radiation image recording and read-out method comprising the steps of:

(i) exposing a recording material to radiation carrying image information in order to store a radiation image thereon, said recording material being provided with a stimulable phosphor layer constituted of a cerium activated lanthanum oxyhalide phosphor which is represented by the general formula LaOX:xCe where X is at least one halogen selected from the group consisting of Cl, Br, and I, and x is a number satisfying the condition $0 < x \leq 0.2$, and in which the atomic ratio X/La satisfies the condition $$0.50 < X/La \leq 0.998$$

(ii) thereafter exposing said recording material to stimulating rays, which cause said recording material to emit light in proportion to the amount of energy stored thereon during its exposure to radiation, and photoelectrically detecting the emitted light in order to obtain an image signal, (iii) carrying out a primary erasing operation in order to release energy remaining on said recording material after the image signal has been obtained therefrom, and (iv) immediately before a next radiation image is stored on said recording material which has been erased during said primary erasing operation, carrying out a secondary erasing operation in order to release energy which was stored on said recording material after said primary erasing operation was carried out thereon.

The present invention also provides a first radiation image recording and read-out apparatus comprising:

(i) a support material, (ii) at least a single recording material secured to said support material and provided with a stimulable phosphor layer constituted of a cerium activated lanthanum oxyhalide phosphor which is represented by the general formula LaOX:xCe where X is at least one halogen selected from the group consisting of Cl, Br, and I, and x is a number satisfying the condition $0 < x \leq 0.2$, and in which the atomic ratio X/La satisfies the condition $$0.50 < X/La \leq 0.998$$

(iii) an image recording section for exposing said recording material to radiation carrying image information in order to store a radiation image on said recording material, (iv) an image read-out section for exposing said recording material, on which a radiation image was stored in said image recording section, to stimulating rays, which cause said recording material to emit light in proportion to the amount of energy stored thereon during its exposure to radiation, and photoelectrically detecting the emitted light in order to obtain an image signal, (v) a primary erasing section for carrying out a primary erasing operation in order to release energy remaining on said recording material after the image signal has been obtained therefrom in said image read-out section, (vi) a secondary erasing section in which, immediately before a next radiation image is stored on said recording material, which was erased during said primary erasing operation, a secondary erasing operation is carried out in order to release energy which was stored on said recording material after said primary erasing operation was carried out thereon, and (vii) a means for moving said support material with respect to said image recording section, said image read-out section, said primary erasing section, and said secondary erasing section such that said recording material is repeatedly brought to said image recording section, said image read-out section, said primary erasing section, and said secondary erasing section in this order.

The present invention further provides a second radiation image recording and read-out apparatus comprising:

(i) a sheet conveyance means for conveying at least a single stimulable phosphor sheet along a predetermined circulation path, said stimulable phosphor sheet being provided with a stimulable phosphor layer constituted of a cerium activated lanthanum oxyhalide phosphor which is represented by the general formula LaOX:xCe where X is at least one halogen selected from the group consisting of Cl, Br, and I, and x is a number satisfying the condition $0 < x \leq 0.2$, and in which the atomic ratio X/La satisfies the condition $$0.50 < X/La \leq 0.998$$

(ii) an image recording section which is located in said circulation path and in which said stimulable phosphor sheet is exposed to radiation carrying image information in order to store a radiation image on said stimulable phosphor sheet, (iii) an image read-out section which is located in said circulation path and in which said stimulable phosphor sheet, on which the radiation image was stored in said image recording section, is exposed to stimulating rays, which cause said stimulable phosphor sheet to emit light in proportion to the amount of energy stored thereon during its exposure to radiation, said emitted light being photoelectrically detected in order to obtain an image signal, (iv) a primary erasing section which is located in said circulation path and in which a primary erasing operation is carried out for releasing any energy remaining on said stimulable phosphor sheet after said image signal has been obtained therefrom in said image read-out section, and (v) a secondary erasing section which is located in said circulation path at a position upstream from said image recording section and in which, immediately before a next radiation image is stored on said stimulable phosphor sheet which was erased during said primary erasing operation, a secondary erasing operation is carried out in order to release energy which was stored on said stimulable phosphor sheet after said primary erasing operation was carried out thereon.

The part of the general formula LaOX:xCe labeled LaOX, which formula represents the stimulable phosphor used in the radiation image recording and read-out method and the radiation image recording and read-out apparatus in accordance with the present invention, indicates that the three elements, lanthanum (La), oxygen (O), and a halogen (X), constitute a crystalline matrix having a PbFCl type of crystal structure. LaOX does not indicate anything about the atomic ratio of the three elements; it does not mean the ratio of La, O, and X with respect to one another is always equal to 1:1:1.

The secondary erasing operation is carried out immediately before a next radiation image is stored on the recording material, which has already been erased during the primary erasing operation. This means that the secondary erasing of the recording material and the recording of a radiation image on the recording material are carried out substantially consecutively; thus the radiation image, which is stored on the recording material immediately after the secondary erasing operation is carried out thereon, will not be adversely affected by any energy stored on the recording material after the primary erasing operation has been carried out thereon. The length of time which is allowed to occur between when the secondary erasure of the recording material is carried out and when the recording of a radiation image on the recording material is carried out varies in accordance with, for example, the conditions under which the radiation image is recorded. By way of example, the length of time occurring between when the secondary erasure of the recording material is carried out and when the recording of a radiation image on the recording material is carried out should preferably be shorter than one to two minutes. Also, the secondary erasing section should be located at a position upstream from the image recording section such that the recording material, which has been erased during the secondary erasing operation, can be conveyed into the image recording section within the allowable length of time described above.

With the radiation image recording and read-out method in accordance with the present invention, a recording material is used which is provided with a stimulable phosphor layer constituted of a cerium activated lanthanum oxyhalide phosphor represented by the general formula LaOX:xCe. In the cerium activated lanthanum oxyhalide phosphor, the atomic ratio of a halogen to lanthanum falls within the specific range described above. Therefore, stimulating rays having comparatively long wavelengths can be used during the readout of a radiation image from the recording material, and a semiconductor laser, or the like, can be used as the source of the stimulating rays. Also, the secondary erasing operation is carried out immediately before a next radiation image is stored on the recording material which was previously erased during the primary erasing operation. Therefore, immediately before the recording material is reused to record a radiation image, it is possible to release any energy which was produced by the radioactive isotope contained in the stimulable phosphor layer and stored on the recording material after it was erased during the primary erasing operation.

With the first and second radiation image recording and read-out apparatuses in accordance with the present invention, a semiconductor laser can be used to produce stimulating rays in the image read-out section. Therefore, the first and second radiation image recording and read-out apparatuses can be kept small and inexpensive. Also, because the secondary erasing section is located at a position upstream from the image recording section, the secondary erasing operation can be carried out reliably before the recording material is reused to record a radiation image.

DESCRIPTION OF THE PREFERRED EMBODIMENTS

The present invention will hereinbelow be described in further detail with reference to the accompanying drawings.

Figure 1:
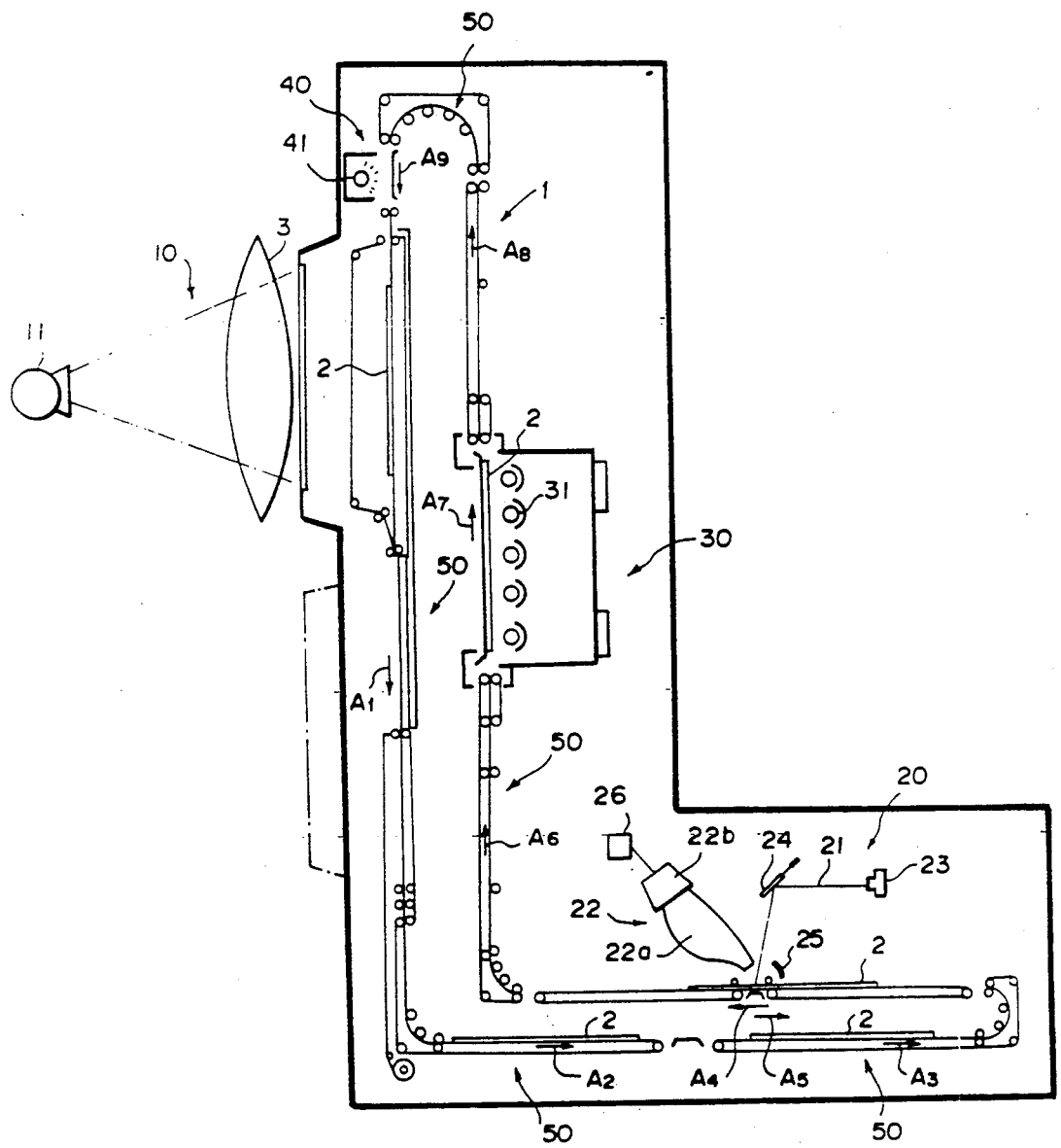
FIG. 1 is a schematic view showing an embodiment of the radiation image recording and read-out apparatus in accordance with the present invention.

With reference to FIG. 1, an embodiment of the radiation image recording and read-out apparatus in accordance with the present invention is provided with a circulation path 1. A plurality of stimulable phosphor sheets 2, 2, . . . , which serve as recording materials, are conveyed and circulated along the circulation path 1 by a sheet conveyance means 50 composed of endless belts, rollers, guide plates and the like. In the circulation path 1 are located, an image recording section 10 for recording a radiation image on a stimulable phosphor sheet 2, and an image read-out section 20 for reading out a radiation image stored on a stimulable phosphor sheet 2. Also, a primary erasing section 30 which is located in the circulation path 1 carries out a primary erasing operation for releasing any energy remaining on a stimulable phosphor sheet 2 after the radiation image has been read out therefrom in the image read-out section 20. The image recording section 10, the image read-out section 20, and the primary erasing section 30 are positioned in this order along the direction of conveyance of stimulable phosphor sheets 2, 2, . . . In the radiation image recording and read-out apparatus, a plurality of stimulable phosphor sheets 2, 2, . . . are sequentially conveyed and circulated by the sheet conveyance means 50 through the image recording section 10, the image read-out section 20, and the primary erasing section 30.

Figure 2:
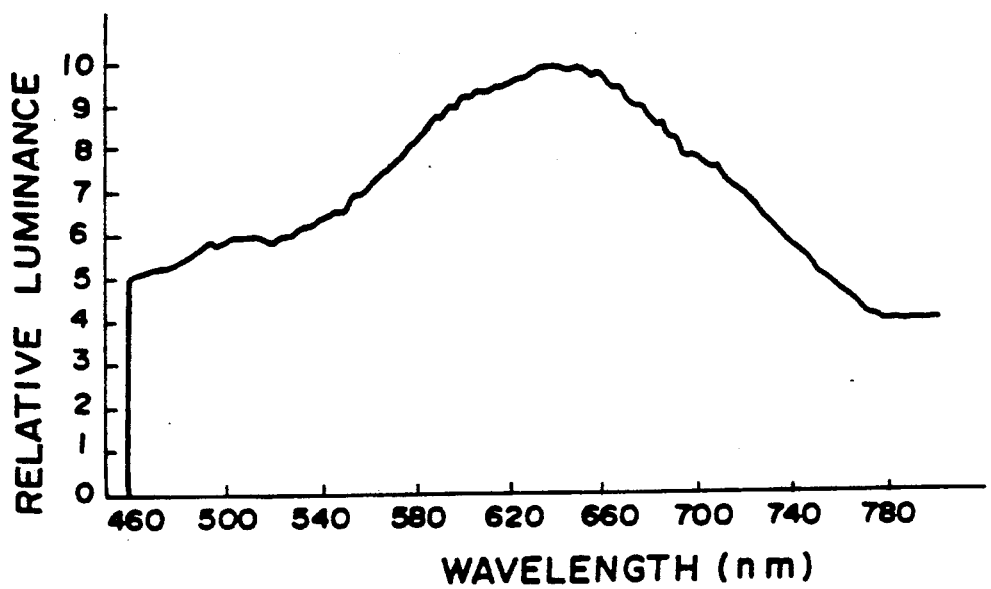
FIG. 2 is a graph showing the stimulation spectrum of a stimulable phosphor represented by the formula LaOBr:Ce.

Each of the stimulable phosphor sheets 2, 2, . . . used in this embodiment is provided with a stimulable phosphor layer which is constituted of a stimulable phosphor represented by the formula LaOBr:Ce. The stimulable phosphor has a crystalline matrix in which the atomic ratio Br/La is 0.7. FIG. 2 shows the stimulation spectrum of the stimulable phosphor sheet 2. As illustrated, the stimulable phosphor sheet 2 emits light with the highest luminance when it is exposed to stimulating rays having a wavelength of 610 nm, and can be stimulated with stimulating rays having wavelengths of up to approximately 800 nm.

In the image recording section 10, radiation produced by a radiation source 11, such as an X-ray source, passes through an object 3 and impinges upon a stimulable phosphor sheet 2. A radiation image of the object 3 is thereby stored on the stimulable phosphor sheet 2. By way of example, five stimulable phosphor sheets 2, 2, . . . are conveyed and circulated in the apparatus, and are sequentially introduced into the image recording section 10. The image recording section 10 can move vertically between the position indicated by the solid line and the position indicated by the broken line in FIG. 1 in accordance with the height of the object 3.

After the radiation image has been stored on a stimulable phosphor sheet 2, the stimulable phosphor sheet 2 is conveyed by the sheet conveyance means 50 in the directions indicated by the arrows A1, A2 and A3 along the circulation path 1, and introduced into the image read-out section 20.

In the image read-out section 20, the stimulable phosphor sheet 2, on which the radiation image has been stored, is scanned with a laser beam 21 serving as stimulating rays, which cause the stimulable phosphor sheet 2 to emit light in proportion to the amount of energy stored thereon during its exposure to the radiation. The emitted light is photoelectrically detected by a photoelectric read-out means 22, which may be constituted of a photomultiplier, or the like. In this manner, an electric image signal to be used in reproducing a visible image is obtained.

In this embodiment, a semiconductor laser 23 is used in the image read-out section 20 in order to produce a laser beam 21 having a wavelength of 780 nm. Because the semiconductor laser 23 is used as the source of the stimulating rays, the image read-out section 20 and the whole apparatus can be kept inexpensive and small in size. Also, as illustrated in FIG. 2, the stimulable phosphor sheet 2 provided with a stimulable phosphor layer, which is constituted of a stimulable phosphor represented by the formula LaOBr:Ce, can be sufficiently stimulated with a laser beam having a wavelength of 780 nm. In FIG. 1, reference numeral 24 denotes a light deflector such as a galvanometer mirror. Reference numeral 25 denotes a reflection mirror which reflects the light emitted by the stimulable phosphor sheet 2 towards a light guide member 22a of the photoelectric read-out means 22. The light guide member 22a guides the incident light through repeated total reflection to a photodetector 22b constituted of a photomultiplier or the like.

The stimulable phosphor sheet 2 located in the image read-out section 20 is conveyed by the sheet conveyance means 50 in the direction indicated by the arrow A4. At the same time, the stimulable phosphor sheet 2 is scanned with the laser beam 21 which is deflected by the light deflector 24 in a direction approximately normal to the direction of conveyance of the stimulable phosphor sheet 2. As a result, the whole surface of the stimulable phosphor sheet 2 is scanned by the laser beam 21. The light emitted by the stimulable phosphor sheet 2 in the course of the scanning is guided by the light guide member 22a and detected by the photodetector 22b. The photodetector 22b converts the detected light into an electric signal. The electric signal is fed into an image processing circuit 26 which processes the electric signal.

As for the readout of a radiation image, there has heretofore been known a method wherein a preliminary read-out operation is carried out, which allows the radiation image stored on the stimulable phosphor sheet 2 to be approximately ascertained before the aforesaid image read-out operation (final read-out operation) is carried out from which an electric image signal to be used in the reproduction of a visible image is obtained. Conditions under which the final read-out operation is to be carried out, or the like, are determined on the basis of information obtained during the preliminary read-out operation.

As disclosed in, for example, U.S. Pat. No. 4,527,060, during the preliminary read-out operation, the stimulable phosphor sheet 2 may be scanned with stimulating rays having an energy level lower than the energy level of the stimulating rays used in the final read-out operation, and the light emitted by the stimulable phosphor sheet 2 during the scanning may be detected by a photoelectric read-out means.

The image read-out section 20 may be constituted such that it conducts only the final read-out operation or both the preliminary read-out operation and the final read-out operation. For example, the preliminary read-out operation may be carried out while the stimulable phosphor sheet 2 is being conveyed in the direction indicated by the arrow A4. The stimulable phosphor sheet 2 may then be conveyed in the reverse direction indicated by the arrow A5 to the position at which the image read-out operation starts. Thereafter, the final read-out operation may be carried out while the stimulable phosphor sheet 2 is again conveyed in the direction indicated by the arrow A4. The optical members at the image read-out section 20 are not limited to those described above. For example, as disclosed in U.S. Pat. No. 4,864,134, a long photomultiplier may be located along the main scanning line as the photoelectric read-out means for detecting the light emitted by the stimulable phosphor sheet 2. As another alternative, instead of deflecting the stimulating rays in the main scanning direction as described above, stimulating rays may be irradiated linearly along a direction normal to the direction of conveyance of the stimulable phosphor sheet 2, and light emitted by the part of the stimulable phosphor sheet 2 which is being exposed may be detected by a line sensor.

After the radiation image has been read from the stimulable phosphor sheet 2 in the image read-out section 20, the stimulable phosphor sheet 2 is conveyed by the sheet conveyance means 50 in the direction indicated by the arrow A6 into the primary erasing section 30.

In the primary erasing section 30, a primary erasing operation is carried out wherein any energy is erased which remains on the stimulable phosphor sheet 2 after the radiation image has been read out therefrom. Specifically, part of the energy stored on the stimulable phosphor sheet 2 during the recording of a radiation image remains stored thereon after the radiation image has been read out therefrom. So that the stimulable phosphor sheet 2 may be reused, the residual energy is erased at the primary erasing section 30. In this embodiment, the primary erasing section 30 is provided with a plurality of primary erasing light sources 31, 31, . . . constituted of fluorescent lamps, tungsten-filament lamps, sodium lamps, xenon lamps, iodine lamps or the like. While the stimulable phosphor sheet 2 is being conveyed in the direction indicated by the arrow A7, it is exposed to the primary erasing light produced by the primary erasing light sources 31, 31, . . . In this manner, the residual energy is released from the stimulable phosphor sheet 2. In the primary erasing section 30, any of known erasing methods may be used. For example, the primary erasing operation may be conducted by heating the stimulable phosphor sheet 2 or by exposing it to the erasing light and heat.

After energy remaining on the stimulable phosphor sheet 2 has been erased in the primary erasing section 30, the stimulable phosphor sheet 2 is conveyed by the sheet conveyance means 50 in the direction indicated by the arrow A8 into the image recording section 10 and is reused in the recording of another radiation image.

The stimulable phosphor represented by the formula LaOBr:Ce contains a radioactive isotope. Therefore, the stimulable phosphor sheet 2 provided with the stimulable phosphor layer constituted of the stimulable phosphor represented by the formula LaOBr:Ce will easily and very quickly store energy from the radioactive isotope. In this embodiment, the primary erasing section 30 and the image recording section 10 are comparatively remote from each other, and therefore the stimulable phosphor sheet 2 will store energy from the radioactive isotope while it is being conveyed from the primary erasing section 30 into the image recording section 10. Also, if the operation of the apparatus is interrupted temporarily and the stimulable phosphor sheet 2 remains in the apparatus for a long time after it has been erased during the primary erasing operation, the stimulable phosphor sheet 2 will store a large amount of energy from the radioactive isotope. Therefore, any radiation image stored thereafter on the stimulable phosphor sheet 2 will be of poor quality because it will be adversely affected by the energy from the radioactive isotope. In this embodiment, in order to eliminate this problem, a secondary erasing section 40 is located adjacent the image recording section 10 on the side upstream therefrom, upstream being taken as opposite the direction of conveyance of the stimulable phosphor sheet 2. The secondary erasing section 40 irradiates secondary erasing light to a stimulable phosphor sheet 2 which has already been erased during the primary erasing operation. The secondary erasing operation in the secondary erasing section 40 is carried out immediately (for example, within one minute or less) before a radiation image is recorded on the stimulable phosphor sheet 2.

Specifically, after being erased in the primary erasing section 30, the stimulable phosphor sheet 2 waits at a position upstream from the primary erasing section 30 and the secondary erasing section 40. When the image recording section 10 is ready to record a radiation image, the stimulable phosphor sheet 2 is conveyed in the direction indicated by the arrow A9 and passes through the secondary erasing section 40. At this time, the stimulable phosphor sheet 2 is exposed to the secondary erasing light produced by a secondary erasing light source 41. The stimulable phosphor sheet 2 is thereafter introduced into the image recording section 10 and is immediately used in the recording of a radiation image. As described above, the stimulable phosphor sheet 2 is exposed to the secondary erasing light in the secondary erasing section 40 immediately before a radiation image is recorded on the stimulable phosphor sheet 2. Therefore, any energy stored on the stimulable phosphor sheet 2 after it has been erased during the primary erasing operation is released reliably, and a radiation image which is not affected by noise is recorded on the stimulable phosphor sheet 2 in the image recording section 10. The amount of energy stored on the stimulable phosphor sheet 2 after it has been erased during the primary erasing operation is smaller than the amount of energy remaining on the stimulable phosphor sheet 2 immediately after the radiation image has been read out therefrom. Therefore, the amount of light produced by the secondary erasing light source 41 in the secondary erasing section 40 may be smaller than the amount of light produced by the primary erasing light sources 31, 31, . . . in the primary erasing section 30. In the secondary erasing section 40, any of known erasing methods may be used.

In order for the stimulable Phosphor sheet 2 to be conveyed into the secondary erasing section 40 immediately before a radiation image is recorded on the stimulable phosphor sheet 2, the sheet conveyance means 50 may be operated in synchronization with the activation of the radiation source 11. Alternatively, an operator of the apparatus may manually input an instruction into the apparatus, when necessary, in order to make the sheet conveyance means 50 move forward, which results in the secondary erasing operation being carried out on the stimulable phosphor sheet 2 which is to be used next in the recording of a radiation image.

In the embodiment described above, a plurality of stimulable phosphor sheets 2, 2, . . . , which can be conveyed independently, are employed as the recording materials. Alternatively, a recording material may be secured to a support material and processed together therewith. An embodiment of the radiation image recording and read-out apparatus in accordance with the present invention, wherein such a recording material is employed, will be described hereinbelow.

Figure 3:
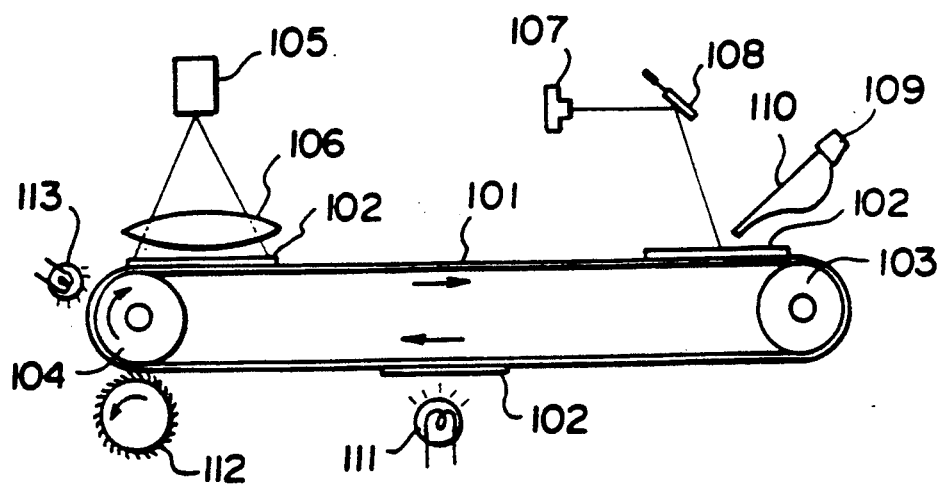
FIGS. 3, 4, and 5 are schematic views showing further embodiments of the radiation image recording and read-out apparatus in accordance with the present invention.

With reference to FIG. 3, an endless conveyor 101, e.g. a belt conveyor or a chain conveyor, is used as the support material for supporting stimulable phosphor sheets 102, 102, 102, each of which is provided with a stimulable phosphor layer constituted of a stimulable phosphor represented by the formula LaOBr:Ce. The stimulable phosphor sheets 102, 102, 102 are secured to the conveyor 101 in such a way that they are equally spaced from each another. The conveyor 101 provided with the stimulable phosphor sheets 102, 102, 102 is engaged with a drive roller 103 and a second roller 104, and moved in the direction indicated by the arrow by the drive roller 103 which is rotated by a drive unit (not shown). In the vicinity of the second roller 104, a radiation source 105 is positioned facing the conveyor 101. An object 106 lies between a stimulable phosphor sheet 102 and the radiation source 105, and a radiation image of the object 106 is projected onto the stimulable phosphor sheet 102. An image read-out section is located in the vicinity of the drive roller 103. The image read-out section comprises a semiconductor laser 107 which produces a laser beam having a wavelength of 780 nm, and a light deflector 108 constituted of a galvanometer mirror or the like. The light deflector 108 deflects the laser beam, which is produced by the semiconductor laser 107, across the conveyor 101, i.e. in the direction normal to the plane of the sheet of FIG. 3. The image read-out section also comprises a light guide member 110, which guides the light emitted by a stimulable phosphor sheet 102 when it is exposed to the laser beam, and a photodetector 109 which detects the light guided through the light guide member 110. A primary erasing light source 111, which constitutes a primary erasing section, is located on the side opposite to the radiation source 105, the semiconductor laser 107, and the photodetector 109, so that the primary erasing light source 111 faces the conveyor 101. The primary erasing light source 111 may be of the same type as the primary erasing light sources 31, 31, . . . of the apparatus shown in FIG. 1.

A cylindrical cleaning roller 112 faces the second roller 104 with the conveyor 101 intervening therebetween. A drive unit (not shown) rotates the cleaning roller 112 counterclockwise in FIG. 3. The cleaning roller 112 removes dust from the surface of the stimulable phosphor sheet 102 as the surface thereof comes into contact with it. If necessary, the cleaning roller 112 may be of an electrostatic attraction type which collects dust and the like by means of electrostatic force.

A secondary erasing light source 113, which constitutes a secondary erasing section, faces the circumferential surface of the second roller 104. The secondary erasing light source 113 irradiates secondary erasing light to a stimulable phosphor sheet 102 before it arrives at the position under the radiation source 105.

The embodiment shown in FIG. 3 operates in the manner described below. The conveyor 101 is intermittently moved a distance corresponding to one-third of the whole circumferential length thereof by the drive roller 103. The conveyor 101 stops moving when a single stimulable phosphor sheet 102 faces the radiation source 105. When the conveyor 101 stops moving, the radiation source 105 is turned on, and the stimulable phosphor sheet 102 facing the radiation source 105 stores the radiation image of the object 106.

After the radiation image is recorded on the stimulable phosphor sheet 102, the conveyor 101 is again moved a distance corresponding to one-third of the whole circumferential length of the conveyor 101. As a result, the stimulable phosphor sheet 102, on which the radiation image has been stored, faces the light deflector 108 and the photodetector 109 when the conveyor 101 stops moving. The stimulable phosphor sheet 102 is scanned with the laser beam produced by the semiconductor laser 107. Specifically, the laser beam is deflected across the conveyor 101 (i.e. in the main scanning direction) by the light deflector 108. At the same time, a platform (not shown) carrying the semiconductor laser 107, the light deflector 108, the photodetector 109, and the light guide member 110 moves along the length of the conveyor 101 (i.e. in the sub-scanning direction). Therefore, the stimulable phosphor sheet 102 is two-dimensionally scanned with the laser beam. The platform can easily be made movable by means of a known linear movement mechanism. When exposed to the laser beam, the stimulable phosphor sheet 102 emits light in proportion to the amount of energy stored thereon during its exposure to radiation. The light emitted by the stimulable phosphor sheet 102 is guided through the light guide member 110 and detected by the photodetector 109. The photodetector 109 generates an electric signal representing the radiation image stored on the stimulable phosphor sheet 102.

After the radiation image has been read out from the stimulable phosphor sheet 102 in this manner, the conveyor 101 is moved once again by a distance corresponding to one-third of the whole circumferential length thereof. As a result, the stimulable phosphor sheet 102, from which the radiation image has been read out, will face the primary erasing light source 111 when the conveyor 101 stops moving. The stimulable phosphor sheet 102 is subjected to a primary erasing operation, during which the stimulable phosphor sheet 102 is exposed to the primary erasing light produced by the primary erasing light source 111, in order to release any energy remaining on the stimulable phosphor sheet 102 after the radiation image has been read out therefrom.

Thereafter, the conveyor 101 is moved by a distance corresponding to one-third of the whole circumferential length thereof, after which the stimulable phosphor sheet 102, which was erased during the primary erasing operation, will face the radiation source 105. While the stimulable phosphor sheet 102 is thus moved, dust present on the surface thereof is removed by the cleaning roller 112. At the same time, the stimulable phosphor sheet 102 is subjected to a secondary erasing operation, during which it is exposed to the secondary erasing light produced by the secondary erasing light source 113. In this manner, the stimulable phosphor sheet 102, which did face the primary erasing light source 111, is conveyed to the position where it will face the radiation source 105 immediately before a radiation image is recorded thereon in the image recording section. Specifically, the primary erasing light source 111 irradiates the primary erasing light to the stimulable phosphor sheet 102 only for a time sufficient to effect the primary erasing operation. Therefore, in cases where a long time occurs between when the primary erasing operation is carried out on a stimulable phosphor sheet 102 and when a radiation image is recorded on the stimulable phosphor sheet 102, the stimulable phosphor sheet 102 will remain in the position where it faces the primary erasing light source 111. During this time the primary erasing light source 111 is off. In such cases, the stimulable phosphor sheet 102, which is represented by the formula LaOBr:Ce, stores energy from the radioactive isotope it contains. The energy thus stored on the stimulable phosphor sheet 102 is reliably released during the secondary erasing operation, which is carried out with the secondary erasing light source 113 immediately before a radiation image is recorded on the stimulable phosphor sheet 102. The stimulable phosphor sheet 102, from which dust has been removed and any energy from radiation has been erased, is reused in the recording of a next radiation image, which takes place when the stimulable phosphor sheet 102 is in the position where it faces the radiation source 105.

In the manner described above, the stimulable phosphor sheets 102, 102, 102 can be circulated and reused in the recording of a radiation image by being subjected to the primary erasing operation using the primary erasing light source 111, the secondary erasing operation using the secondary erasing light source 113, and the cleaning operation using the cleaning roller 112. A single stimulable phosphor sheet 102 is sequentially subjected to the image recording operation, the image read-out operation, and the primary and secondary erasing operations while the conveyor 101 rotates one full turn. It is, of course, possible for these operations to occur simultaneously for the three stimulable phosphor sheets 102, 102, 102, respectively, when the conveyor 101 has stopped. In such cases, the speed with which radiation images are processed can be kept high.

In the embodiment of FIG. 3, the scanning of a stimulable phosphor sheet 102 in the sub-scanning direction is conducted by moving the stimulating ray irradiating system and the light detection system with respect to the stimulable phosphor sheet 102 while the stimulable phosphor sheet 102 is stationary. However, it is also possible to keep the stimulating ray irradiating system and the light detection system stationary, and move the stimulable phosphor sheet 102 in order to conduct the scanning in the sub-scanning direction.

In order to move the stimulable phosphor sheets 102, 102, 102 for this purpose, instead of being directly fixed on the conveyor 101, they may be mounted on a platform and the platform may be mounted on the conveyor 101. During the image read-out operation, the platform may move while the conveyor 101 is stationary. After the image read-out operation has been finished, the platform may be returned to a predetermined position. Alternatively, the stimulable phosphor sheets 102, 102, 102 may be mounted directly on the conveyor 101, and the sub-scanning may be accomplished by having the conveyor 101 move. In the latter case, the distance between the image recording section and the image read-out section may be different from the distance between the adjacent stimulable phosphor sheets 102, 102. After the conveyor 101 has been moved in order to effect the sub-scanning of a stimulable phosphor sheet 102, the conveyor 101 may be moved again in order to bring the next stimulable phosphor sheet 102 to the image recording section. In this case, the image recording operation and the image read-out operation are not conducted at the same time. As another alternative, in cases where the image recording operation and the image read-out operation should be carried out simultaneously in order to speed up the processing of the stimulable phosphor sheets 102, 102, 102, the conveyor 101 may be moved such that the stimulating rays will scan a single stimulable phosphor sheet 102 in the sub-scanning direction while a radiation image is being recorded through a slit on the next stimulable phosphor sheet 102, which is also moving as the conveyor 101 moves. It is also possible to use several conveyors between which the stimulable phosphor sheets can automatically be transferred, and operate the conveyors in such a manner that the stimulable phosphor sheets are ultimately circulated via these conveyors. In such cases, when the speed with which a radiation image is read out is much lower than the speed with which a radiation image is recorded, it becomes possible to increase the speed, with which the stimulable phosphor sheets are processed, by providing a plurality of image read-out sections, connecting the conveyors branching from the image recording section to the respective image read-out sections, and supplying the stimulable phosphor sheets to the respective image read-out sections. Further, when the stimulable phosphor sheets are transferred among a plurality of conveyors as described above, it is possible to connect two conveyors via a single platform on which the stimulable phosphor sheets are temporarily stored. This connection technique is advantageous because the platform allows stimulable phosphor sheets which have deteriorated to be removed from the apparatus or new stimulable phosphor sheets to be added thereto without the operation of the apparatus having to be interrupted.

Figure 4:
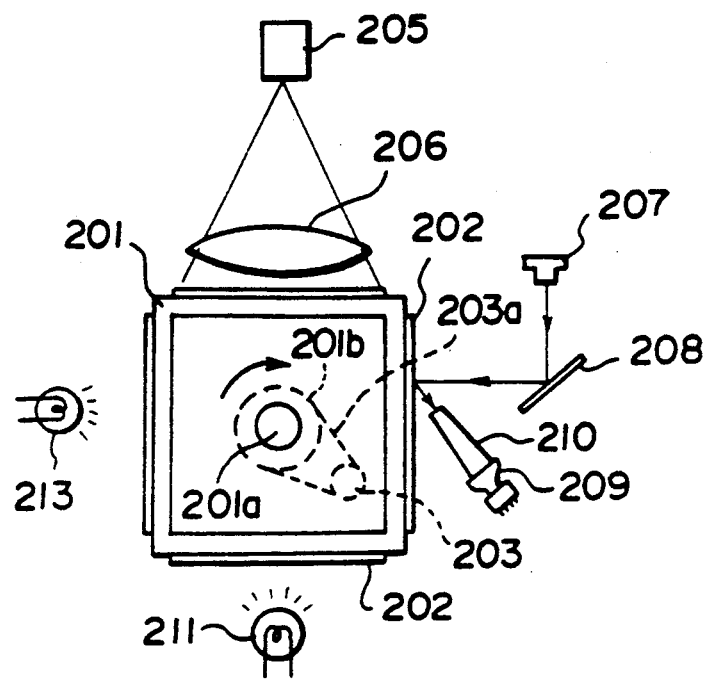

In the embodiment of FIG. 3, since the stimulable phosphor sheets 102, 102, 102 are secured to the conveyor 101, which is positioned around the rollers 103 and 104, the stimulable phosphor sheets 102, 102, 102 must be flexible. However, from the viewpoint of the durability of stimulable phosphor sheets and the formation of radiation images having good quality, it is desirable for the stimulable phosphor sheets not to undergo bending. FIG. 4 shows an embodiment of a radiation image recording and read-out apparatus in accordance with the present invention, wherein stimulable phosphor sheets are secured to rigid support materials which do not allow the stimulable phosphor sheets to bend as they circulate.

In the embodiment of FIG. 4, four stimulable phosphor sheets 202, 202, ... are secured to side surfaces of a four-sided prism-like support 201. Each of the stimulable phosphor sheets 202, 202, ... is provided with a stimulable phosphor layer which is constituted of a stimulable phosphor represented by the formula LaOBr:Ce. The support 201 is provided with a shaft 201a to which a rotation member 201b, such as a sprocket wheel, is secured. The force generated by a drive unit 203 is transferred to the rotation member 201b via a force transfer member 203a, such as a chain. The drive unit 203A rotates the support 201 at intervals of 90° in the direction indicated by the arrow. A radiation source 205 faces one side surface of the support 201. A semiconductor laser 207, a light deflector 208, a photodetector 209, and a light guide member 210 are provided in the vicinity of the side surface of the support 201 opposite to the side surface facing the radiation source 205. The semiconductor laser 207 serves as a stimulating ray source and produces a laser beam having a wavelength of 780 nm. A primary erasing light source 211, with which a primary erasing operation is carried out, faces the side surface of the support 201 which side surface is opposite to the side surface facing the radiation source 205. Also, a secondary erasing light source 213, with which a secondary erasing operation is carried out, faces the side surface of the support 201, which is present adjacent to and on the side upstream from the side surface facing the radiation source 205 (the upstream side is taken in the direction along which the support 201 rotates). The radiation source 205, the semiconductor laser 207, and the other parts located around the turret 201 may be of the same types as those used in the embodiment of FIG. 3. The means employed in the apparatus of FIG. 4 in order to support and circulate the stimulable phosphor sheets differs from that in the apparatus of FIG. 3.

In the same manner as in FIG. 3, when the support 201 stops moving, the radiation source 205 is turned on in order to store a radiation image of an object 206 on a stimulable phosphor sheet 202.

Thereafter, the support 201 is rotated by an angle of 90°, and when the support 201 stops moving, the stimulable phosphor sheet 202, on which the radiation image has been stored, will face the light deflector 208, the photodetector 209 and the like. When it is in this position, the stimulable phosphor sheet 202 is scanned with a laser beam produced by the semiconductor laser 207, which causes it to emit light in proportion to the amount of energy stored thereon during its exposure to radiation. The light emitted by the stimulable phosphor sheet 202 is detected by the photodetector 209, which outputs an electric image signal representing the radiation image stored on the stimulable phosphor sheet 202. In the embodiment of FIG. 4, it is difficult to accomplish the sub-scanning with the laser beam by means of the rotation of the support 201. Therefore, one of the other sub-scanning methods described above is employed.

After the radiation image is read out from the stimulable phosphor sheet 202, the support 201 is rotated by an angle of 90°, after which the stimulable phosphor sheet 202 faces the primary erasing light source 211. At this time, the stimulable phosphor sheet 202 is subjected to a primary erasing operation in which it is exposed to primary erasing light produced by the primary erasing light source 211, which erases any energy remaining on the stimulable phosphor sheet 202.

Thereafter, the support 201 is rotated by an angle of 90°, after which the stimulable phosphor sheet 202 faces the secondary erasing light source 213. The stimulable phosphor sheet 202 waits at this position until a radiation image is to be stored thereon. When the recording of a radiation image is about to take place, the secondary erasing light source 213 is turned on, and the stimulable phosphor sheet 202 is subjected to the secondary erasing operation. The stimulable phosphor sheet 202, which has thus been erased, is immediately brought to where it faces the radiation source 205 and a radiation image is recorded thereon.

In the embodiments of FIGS. 3 and 4, stimulable phosphor sheets are secured to the support material. Alternatively, an endless support material may be employed and a stimulable phosphor layer constituted of a stimulable phosphor represented by the formula LaOBr:Ce may be overlaid thereon. For example, as shown in FIG. 5, a stimulable phosphor layer may be overlaid on the surface of an endless belt or a rotatable drum.

Figure 5:
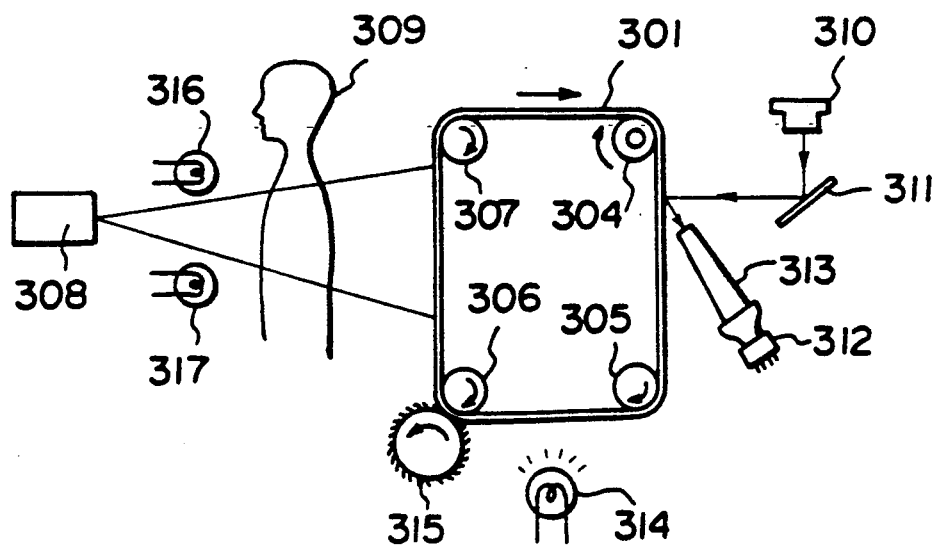

In FIG. 5, an endless belt-like recording member 301 is used. The recording member 301 is composed of an endless belt-like support material, which is flexible, and a stimulable phosphor layer (recording material), which is constituted of a stimulable phosphor represented by the formula LaOBr:Ce and which is overlaid on the support material. The recording member 301 is threaded over a cylindrical drive roller 304 and second, third and fourth cylindrical rollers 305, 306 and 307, and is moved in the direction indicated by the arrow by the drive roller 304. The drive roller 304 is rotated by a drive unit (not shown). A radiation source 308 faces the portion of the recording member 301 between the third and fourth rollers 306 and 307. A semiconductor laser 310, which serves as a stimulating ray source and which produces a laser beam having a wavelength of 780 nm, a light deflector 311, a photodetector 312, and a light guide member 313 face the portion of the recording member 301 between the drive roller 304 and the second roller 305. Also, a primary erasing light source 314, with which a primary erasing operation is carried out, faces the portion of the recording member 301 between the second and third rollers 305 and 306. A cylindrical cleaning roller 315 faces the third roller 306 with the recording member 301 intervening therebetween. The cleaning roller 315 is rotated counterclockwise in the drawing by a drive unit (not shown), and removes dust from the surface of the recording member 301 when it comes into contact with the cleaning roller 315. Secondary erasing light sources 316 and 317, with which a secondary erasing operation is carried out, are located in the vicinity of the radiation source 308. The radiation source 308, the semiconductor laser 310, and other parts located around the recording member 301 may be of the same types as those employed in the embodiment of FIG. 3 or 4.

The recording member 301 is intermittently moved a distance corresponding to one-fourth of the entire circumferential length thereof by the drive roller 304. When the recording member 301 stops moving, the radiation source 308 is turned on in order to store a radiation image of the object 309 on the portion of the stimulable phosphor layer of the recording member 301 which is present between the third and fourth rollers 306 and 307.

Thereafter, the recording member 301 is moved twice the distance corresponding to one-fourth of the whole circumferential length of the recording member 301, and the portion of the stimulable phosphor layer on which the radiation image has been stored is brought to a position between the drive roller 304 and the second roller 305. At this time, the stimulable phosphor layer is scanned with the laser beam produced by the semiconductor laser 310. The light emitted by the stimulable phosphor layer as it is scanned is guided through the light guide member 313 and detected by the photodetector 312. During the scanning operation, the laser beam is deflected across the recording member 301 (i.e. in the main scanning direction) by the light deflector 311. At the same time, a platform (not shown) on which the semiconductor laser 310, the light deflector 311, the photodetector 312, and the light guide member 313 are supported is moved along the length of the recording member 301. Therefore, the laser beam will also scan the stimulable phosphor layer in the longitudinal direction of the recording member 301 (i.e. in the sub-scanning direction).

After the radiation image is read out from the stimulable phosphor layer in the manner described above, the recording member 301 is further moved by a distance corresponding to one-fourth of the whole circumferential length thereof. When the recording member 301 stops moving, the portion of the stimulable phosphor layer, from which the radiation image has been read out, is positioned between the second and third rollers 305 and 306. At this time, the recording member 301 is subjected to the primary erasing operation, which exposes the stimulable phosphor layer to the primary erasing light produced by the primary erasing light source 314 and erases any energy remaining on the stimulable phosphor layer after the radiation image has been read out therefrom.

Thereafter, the recording member 301 is moved until the erased portion of the stimulable phosphor layer is brought to a position between the third and fourth rollers 306 and 307. As it moves, dust present on the surface of the recording member 301 is removed by the cleaning roller 315. This portion of the recording member 301 is now free of any energy and dust, and when it reaches a position between the third and fourth rollers 306 and 307, the recording member 301 remains stationary until a radiation image is to be recorded on said portion of the recording member 301. Immediately before radiation is irradiated by the radiation source 308 to said portion of the recording member 301, the secondary erasing light sources 316 and 317 are turned on in order to carry out the secondary easing operation on said portion of the recording member 301.

It is, of course, possible for the image recording operation, the image read-out operation and the primary erasing operation to take place simultaneously at three different portions of the recording member 301. In such cases, the speed with which these operations are carried out can be kept high. Also, the scanning of the stimulable phosphor layer in the sub-scanning direction may be carried out by keeping the stimulating ray irradiation system and the light detection system stationary and moving the recording member 301. For this purpose, after a radiation image has been recorded on a portion of the recording member 301, the recording member 301 may be moved at a speed such that the sub-scanning can be effected, and thus the radiation image may be read out from said portion of the recording member 301. While the recording member 301 is moving, it is also possible to irradiate radiation through a slit to the portion thereof upon which a radiation image is to be recorded. In such cases, the recording of a radiation image and the readout of a radiation image can be carried out without having to stop the recording member 301.

In the embodiments described above, a stimulable phosphor, which is represented by the formula LaOBr:Ce and in which the atomic ratio of Br to La is 0.7, constitutes the stimulable phosphor layer of the recording material. However, the stimulable phosphor layer of the recording material may be constituted of any of cerium activated lanthanum oxyhalide phosphors which are represented by the general formula LaOX:xCe, where X is at least one halogen selected from the group consisting of Cl, Br, and I, and x is a number satisfying the condition $0 < x \leq 0.2$, and in which the atomic ratio X/La satisfies the condition $0.50 < X/La \leq 0.998$. Such a stimulable phosphor can be stimulated with stimulating rays having a comparatively long wavelength, and therefore a semiconductor laser can be used in order to produce the stimulating rays. When a semiconductor laser is employed as the source of the stimulating rays, the radiation image recording and read-out apparatus can be kept inexpensive and small in size. The aforesaid stimulable phosphor can also be stimulated by a laser beam produced by an He-Ne laser, or the like, which has heretofore been used widely. The source of the stimulating rays in the present invention is not limited to semiconductor lasers.

We claim:

1. A radiation image recording and read-out method comprising the steps of:
   (i) exposing a recording material to radiation carrying image information in order to store a radiation image thereon, said recording material being provided with a stimulable phosphor layer constituted of a cerium activated lanthanum oxyhalide phosphor which is represented by the general formula LaOX:xCe where X is at least one halogen selected from the group consisting of Cl, Br, and I, and x is a number satisfying the condition $0 < x \leq 0.2$, and in which the atomic ratio X/La satisfies the condition $0.50 < X/La \leq 0.998$ (ii) thereafter exposing said recording material to stimulating rays, which cause said recording material to emit light in proportion to the amount of energy stored thereon during its exposure to radiation, and photoelectrically detecting the emitted light in order to obtain an image signal,
   (iii) carrying out a primary erasing operation in order to release energy remaining on said recording material after the image signal has been obtained therefrom, and
   (iv) immediately before a next radiation image is stored on said recording material which has been erased during said primary erasing operation, carrying out a secondary erasing operation in order to release energy which was stored on said recording material after said primary erasing operation was carried out thereon.

2. A method as defined in claim 1 wherein said stimulating rays are a laser beam.

3. A method as defined in claim 2 wherein said laser beam is produced by a semiconductor laser.

4. A method as defined in claim 1 wherein the three elements La, O, and X in said cerium activated lanthanum oxyhalide phosphor represented by the general formula LaOX:xCe constitute a crystalline matrix having a PbFCl type of crystal structure.

5. A radiation image recording and read-out apparatus comprising:
   (i) a support material,
   (ii) at least a single recording material secured to said support material and provided with a stimulable phosphor layer constituted of a cerium activated lanthanum oxyhalide phosphor which is represented by the general formula LaOX:xCe where X is at least one halogen selected from the group consisting of Cl, Br, and I, and x is a number satisfying the condition $0 < x \leq 0.2$, and in which the atomic ratio X/La satisfies the condition $0.50 < X/La \leq 0.998$ (iii) an image recording section for exposing said recording material to radiation carrying image information in order to store a radiation image on said recording material,
   (iv) an image read-out section for exposing said recording material, on which a radiation image was stored in said image recording section, to stimulating rays, which cause said recording material to emit light in proportion to the amount of energy stored thereon during its exposure to radiation, and photoelectrically detecting the emitted light in order to obtain an image signal,
   (v) a primary erasing section for carrying out a primary erasing operation in order to release energy remaining on said recording material after the image signal has been obtained therefrom in said image read-out section,
   (vi) a secondary erasing section in which, immediately before a next radiation image is stored on said recording material, which was erased during said primary erasing operation, a secondary erasing operation is carried out in order to release energy which was stored on said recording material after said primary erasing operation was carried out thereon, and
   (vii) a means for moving said support material with respect to said image recording section, said image read-out section, said primary erasing section, and said secondary erasing section such that said recording material is repeatedly brought to said image recording section, said image read-out section, said primary erasing section, and said secondary erasing section in this order.

6. An apparatus as defined in claim 5 wherein said support material is an endless support material.

7. An apparatus as defined in claim 5 wherein said endless support material is an endless belt.

8. An apparatus as defined in claim 5 wherein said endless support material is a rotatable drum.

9. An apparatus as defined in claim 5, 6, 7, or 8 wherein said recording material is a stimulable phosphor layer overlaid on said support material.

10. An apparatus as defined in claim 5, 6, 7, or 8 wherein said recording material is a stimulable phosphor sheet secured to said support material.

11. An apparatus as defined in claim 5 wherein said stimulating rays are a laser beam.

12. An apparatus as defined in claim 11 wherein said laser beam is produced by a semiconductor laser.

13. An apparatus as defined in claim 5 wherein the three elements La, O, and X in said cerium activated lanthanum oxyhalide phosphor represented by the general formula LaOX:xCe constitute a crystalline matrix having a PbFCl type of crystal structure.

14. A radiation image recording and read-out apparatus comprising:
   (i) a sheet conveyance means for conveying at least a single stimulable phosphor sheet along a predetermined circulation path, said stimulable phosphor sheet being provided with a stimulable phosphor layer constituted of a cerium activated lanthanum oxyhalide phosphor which is represented by the general formula $$LaOX:xCe$$

where X is at least one halogen selected from the group consisting of Cl, Br, and I, and x is a number satisfying the condition $0 < x \leq 0.2$, and in which the atomic ratio X/La satisfies the condition $$0.50 < X/La \leq 0.998$$

(ii) an image recording section which is located in said circulation path and in which said stimulable phosphor sheet is exposed to radiation carrying image information in order to store a radiation image on said stimulable phosphor sheet, (iii) an image read-out section which is located in said circulation path and in which said stimulable phosphor sheet, on which the radiation image was stored in said image recording section, is exposed to stimulating rays, which cause said stimulable phosphor sheet to emit light in proportion to the amount of energy stored thereon during its exposure to radiation, said emitted light being photoelectrically detected in order to obtain an image signal, (iv) a primary erasing section which is located in said circulation path and in which a primary erasing operation is carried out for releasing any energy remaining on said stimulable phosphor sheet after said image signal has been obtained therefrom in said image read-out section, and (v) a secondary erasing section which is located in said circulation path at a position upstream from said image recording section and in which, immediately before a next radiation image is stored on said stimulable phosphor sheet which was erased during said primary erasing operation, a secondary erasing operation is carried out in order to release energy which was stored on said stimulable phosphor sheet after said primary erasing operation was carried out thereon.

15. An apparatus as defined in claim 14 wherein said stimulating rays are a laser beam.

16. An apparatus as defined in claim 15 wherein said laser beam is produced by a semiconductor laser.

17. An apparatus as defined in claim 14 wherein the three elements La, O, and X in said cerium activated lanthanum oxyhalide phosphor represented by the general formula LaOX:xCe constitute a crystalline matrix having a PbFCl type of crystal structure.

* * * * *